Dec. 21, 1943.    R. W. ERDLE    2,337,036
RESILIENT MOLD
Filed Oct. 22, 1938    4 Sheets-Sheet 1
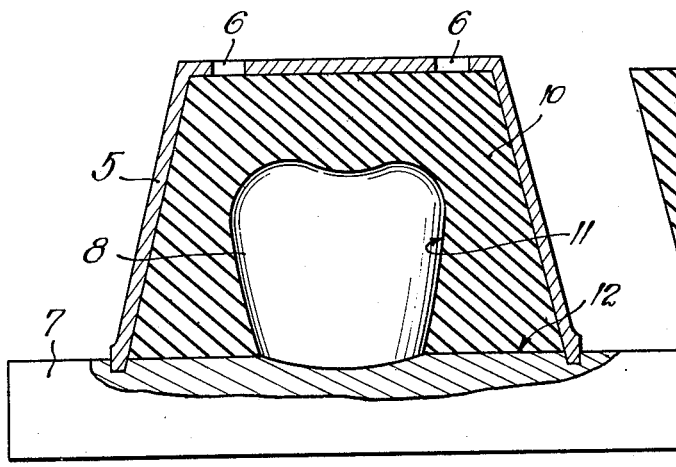
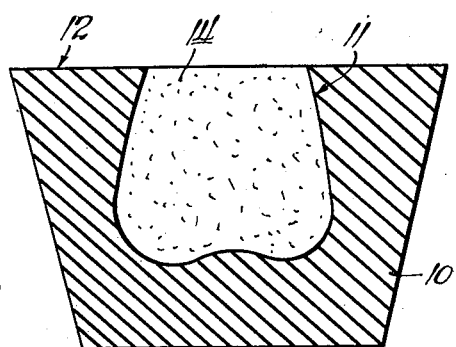
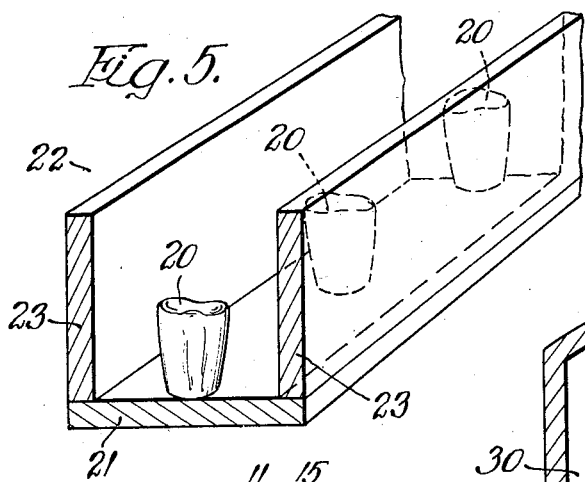
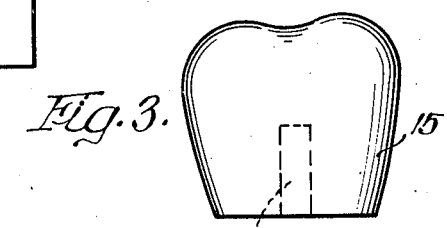
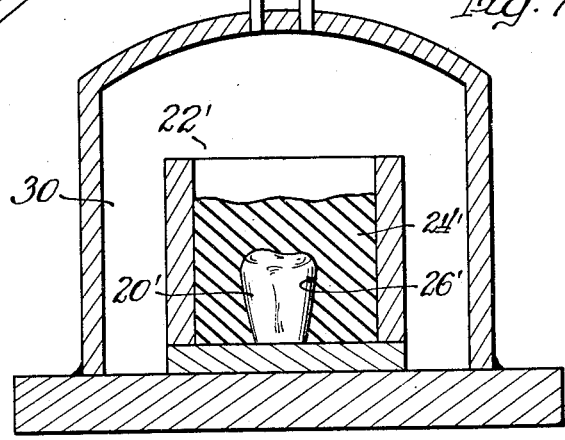
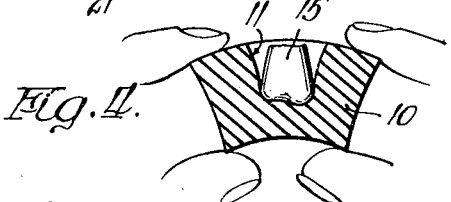
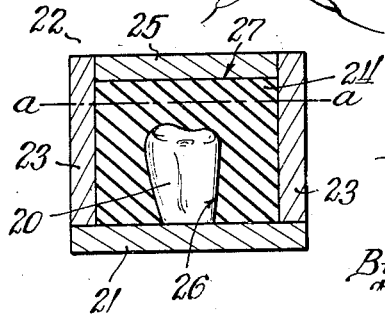
Inventor:
Reiner W. Erdle.

Dec. 21, 1943.                R. W. ERDLE                2,337,036
                            RESILIENT MOLD
              Filed Oct. 22, 1938              4 Sheets-Sheet 2
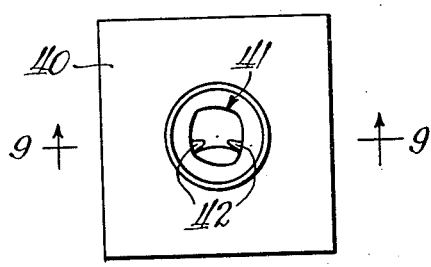
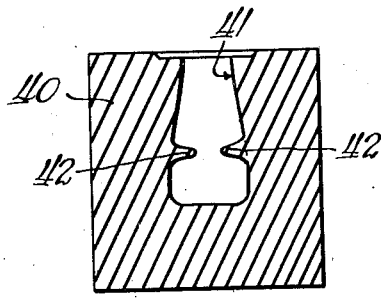
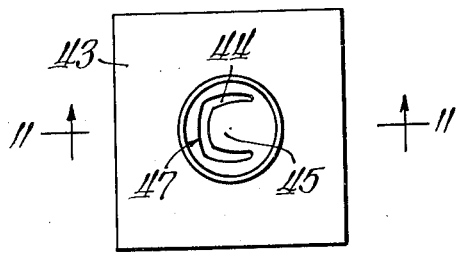
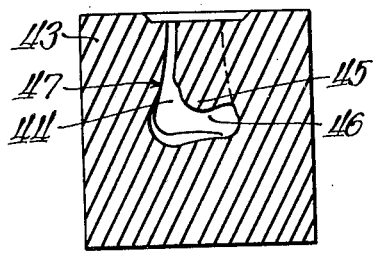
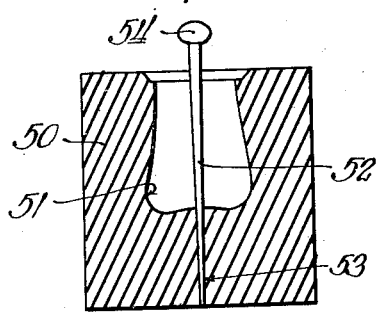
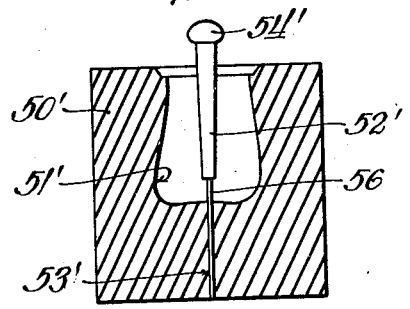
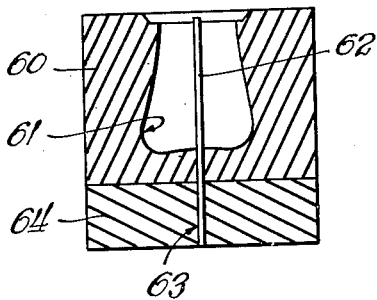

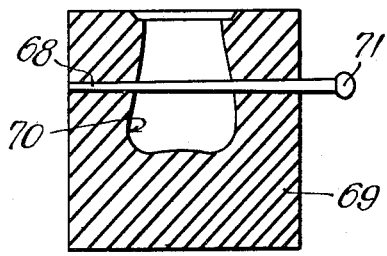
Fig.15.
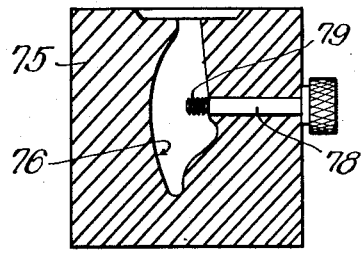
Fig.16.
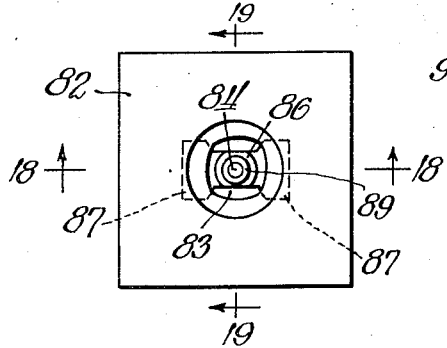
Fig.17. Fig.20. Fig.18.
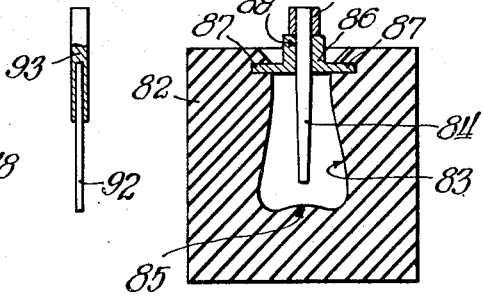
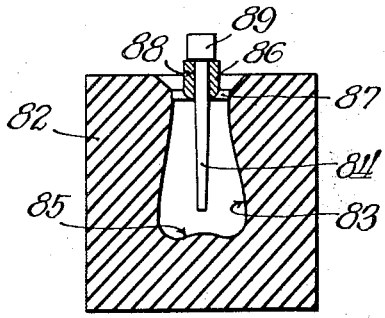
Fig.19.
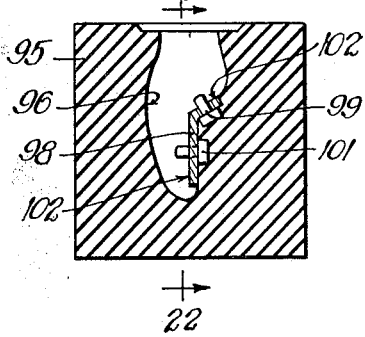
Fig.21.
Fig.22.
Inventor:
Reiner W. Erdle.

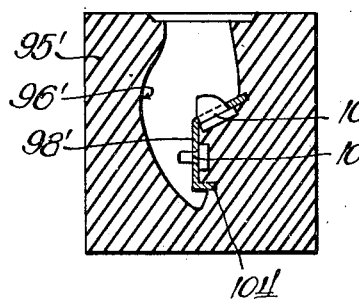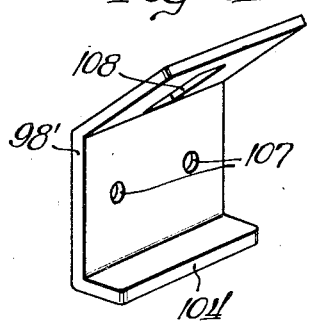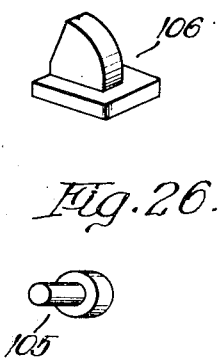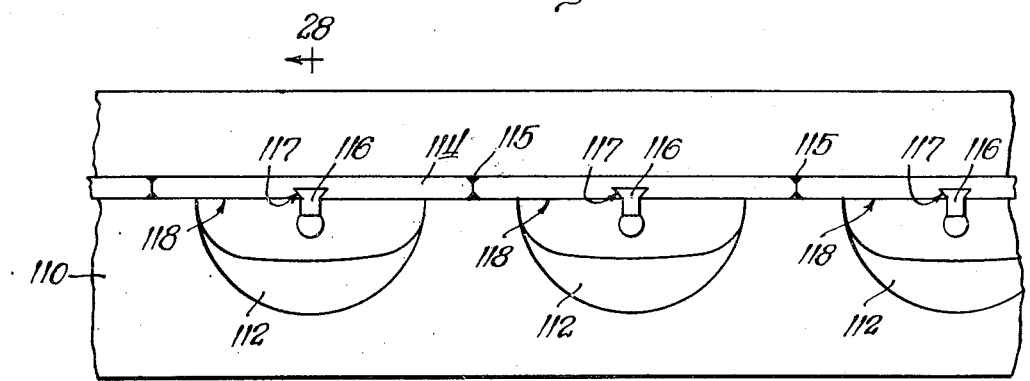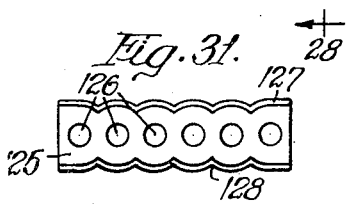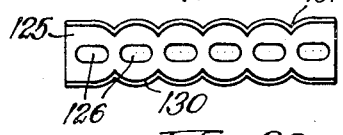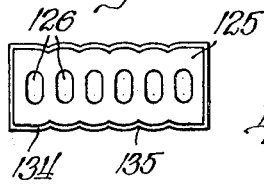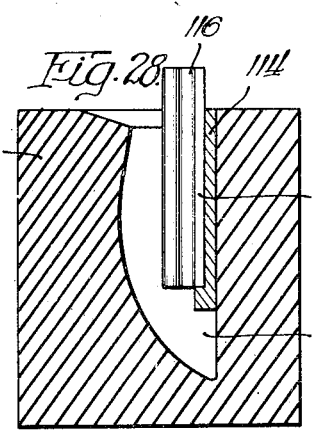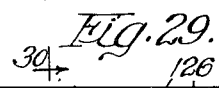

Patented Dec. 21, 1943

2,337,036

UNITED STATES PATENT OFFICE 2,337,036

RESILIENT MOLD

Reiner W. Erdle, Chicago, Ill., assignor to Dental Research Corporation, Chicago, Ill., a corporation of Illinois Application October 22, 1938, Serial No. 236,379

4 Claims. (Cl. 18—47)

This invention relates to molds and, more specifically, to an improved form of resilient mold for use in making porcelain dental articles, such as teeth.

The present application is a continuation in part of my copending application, Serial No. 101,740, filed September 21, 1936.

One of the main objects of my present invention is to provide a resilient mold for porcelain dental articles, such as teeth, comprising a mold body of resilient material with one or more suitably shaped mold cavities adapted for producing green or unfired porcelain articles with or without undercuts or projecting parts, and having the characteristic of accurately reproducing all fine details of the natural teeth, or other article, without defects along the molded surfaces, and having at the same time the further characteristic of relatively great resilience to permit, by flexing the mold, removal of the green or unfired porcelain article without destroying the molded shape of such article.

The mold comprises a mold body having one or more suitably shaped mold cavities and formed of a material having the characteristics of a polymerized vinyl halide in the form of a resilient gel.

Another object is to adapt the resilient mold of my present invention for the formation of various forms of teeth, and to provide means in combination with the resilient mold for assuring accurate size and positioning of holes, straight or flat parts and other portions of the teeth which contact or cooperate, by way of example, with a metal backing or support.

Another feature consists in providing a resilient mold body of the class described and distorting the mold body to different distorted conditions to shape the one or more mold cavities therein to different shapes to produce teeth of different shapes with the same mold.

Further features and advantages of the invention will be apparent from the following detailed description taken in connection with the accompanying drawings, in which:

Figure 1 is a more or less diagrammatic section showing one method of and means for making a resilient mold embodying the present invention;

Figure 2 is a section through the resilient mold formed according to the method and with the means of Figure 1, and showing more or less generally the manner of molding a porcelain tooth therein;

Figure 3 is an elevational view of an artificial tooth formed in the mold shown in Figure 2;

Figure 4 is a section similar to Figure 2 showing how the green or unfired porcelain tooth is removed from the mold by flexing the same;

Figure 5 is a fragmentary section showing another form of means for making a resilient mold embodying the present invention;

Figure 6 is a section showing the mold forming means of Figure 5, and the manner of forming the mold therein;

Figure 7 is a more or less diagrammatic section showing a method of and means for removing or eliminating air bubbles between the mold material and the surface of the master model or pattern so as to produce a resilient mold without defects on the molding surface;

Figure 8 is a top plan view of a resilient mold embodying the present invention and provided with integral protrusions extending into the mold cavity for forming recesses in the opposite sides of the tooth;

Figure 9 is a section taken on the line 9—9 of Figure 8;

Figure 10 is a top plan view showing a resilient mold embodying the present invention, with the mold cavity shaped to form a posterior tooth the shape of a three-quarter crown;

Figure 11 is a section taken on the line 11—11 of Figure 10;

Figure 12 is a vertical section through a mold embodying the present invention and provided with means for forming a tube tooth in the mold cavity;

Figure 13 is a view similar to Figure 12 showing the metal pin reduced at the lower end;

Figure 14 is a vertical section showing a mold formed of a combination of soft and relatively hard resilient material with a metal pin held by the relatively hard mold material in position to form a tube tooth in the mold cavity;

Figure 15 is a view similar to Figure 12 with the exception that the tapered metal pin is put in sideways through the mold;

Figure 16 is a section through a mold embodying the present invention and provided with means for forming a threaded recess in the green porcelain tooth;

Figure 17 is a section through a mold embodying the present invention provided with a metal insert and metal pin for producing a so-called porcelain crown with a hole which does not go all the way through the tooth;

Figure 18 is a section taken on the line 18—18 of Figure 17;

Figure 19 is a section taken on the line 19—19 of Figure 17;

Figure 20 is a modified form of pin for the resilient mold;

Figure 21 is a vertical section through a resilient mold embodying the present invention and provided with a metal insert to produce a so-called bridge tooth;

Figure 22 is a section taken on the line 22—22 of Figure 21;

Figure 23 is a section similar to Figure 21, showing the resilient mold with another form of insert means to produce a so-called bridge tooth;

Figure 24 is an enlarged perspective view of the metal insert shown in Figure 23;

Figure 25 is a perspective view of one of the recess forming members shown in Figure 23;

Figure 26 is a perspective view of one of the two lower pins shown in Figure 23;

Figure 27 is a modified form of resilient mold for producing porcelain facings;

Figure 28 is a section taken on the line 28—28 of Figure 27;

Figure 29 is a longitudinal section through a mold embodying the present invention, showing the same set in a metal channel;

Figure 30 is a cross-section taken on the line 30—30 of Figure 29;

Figure 31 is a top plan view of the mold shown in Figures 29 and 30, showing the corrugated form of the side walls of the channel;

Figure 32 is a view similar to Figure 31, showing the same flexible mold in a somewhat narrower channel formed to hold the mold body elongated lengthwise to increase the dimensions of the mold cavity lengthwise of the mold with a reduction in the dimensions of said cavity laterally; and Figure 33 is a view similar to Figures 31 and 32, showing a different form of channel for holding the same mold body compressed lengthwise and extended transversely.

Referring first to Figures 1, 2, and 3 of the drawings, there is shown, by way of example only, one suitable means for making a resilient mold embodying the present invention and the manner of making a porcelain dental article, such as a tooth, in the mold.

A flask 5, provided at its top with openings 6, is placed in inverted position upon a base 7. A pattern 8 of the tooth or other article is placed within the flask 5 and upon the base 7, and the mold material is melted for example in a porcelain dish and poured, while hot and fluid, into the flask 5 through one or more of the openings 6 completely to enclose the sides and occlusal surface of the tooth pattern and to a level substantially filling the flask 5. The openings 6 permit the escape of air.

The mold material is then allowed to cool and sets to the form of a resilient rubbery solid mold body 10 having a mold cavity 11 shaped to form the artificial tooth or other article. The inner mold surface accurately reproduces all fine details of the natural tooth, so that a much more natural appearance is presented. Moreover, the inner mold surface is continuous throughout and does not have parting lines or the like such as are produced where rigid sectionalized molds or divided mold linings are employed.

The resilient mold material is preferably in the form of a polymerized vinyl chloride or other polymerized vinyl halide plasticized with a material such as tricresyl phosphate or other suitable material such as the so-called solvents more fully described in Waldo M. Semon, United States Patent No. 1,929,453, patented October 10, 1933. Where a plasticized vinyl halide is employed as the mold material it may, by way of example, be prepared according to the Semon patent above mentioned, which sets out full details of the material and method of preparing same which will not be repeated here.

The mold cavity 11 opens from the side 12 of the resilient mold body and may be undercut inwardly as shown, or provided with undercut or projecting parts as will presently appear. Upon setting of the mold body 10, the flask 5 is removed. The great resilience of the mold body permits the pattern 8 to be removed by grasping the mold in the hands and flexing the same in the manner shown in Figure 4 to release the pattern or master model. Upon removal of the pattern 8, the resilient character of the mold body brings it back to its original shape without destroying the contour of the cavity 11 as produced by the pattern 8.

The porcelain tooth or other porcelain article may, by way of example, be formed in the cavity 11 of the resilient mold body 10 according to the method described and claimed in my copending application, Serial No. 101,740, filed September 21, 1936. Suffice it here to state that this method comprises moistening finely ground porcelain, placing the same in the mold cavity 11 as indicated at 14 in Figure 2, and compacting the moistened and finely ground porcelain in the flexible mold to the form of a firm body by prolonged vibration. The porcelain may be moistened with water, and if desired a suitable binder may be employed, and the tooth may be shaded as more fully described in my above mentioned copending application.

After the porcelain has been compacted to the form of a firm body, the mold 10 may be again grasped in the hands, and flexed as shown in Figure 4 to release or remove the molded tooth shown at 15 in Figure 3 from the mold. The extraordinary great resilience of the mold 10 permits removal of the compacted green or unfired tooth from the mold notwithstanding undercuts or projecting parts and without destroying the molded shape of the unfired porcelain tooth. Upon removal of the tooth the resilient mold may body again springs back to its original shape without destroying the contour of the cavity 11 as produced by the pattern 8, so that the mold may be used for forming additional teeth as and where desired. After removal from the mold 10, the tooth 15 is fire-hardened to form the finished porcelain tooth.

The polymerized vinyl halide mold material above described has the advantageous properties described in Semon Patent No. 1,929,453, and the present invention utilizes the extraordinary great resilience of this material to permit removal of the compacted but unfired porcelain article from the mold, notwithstanding undercuts or projecting parts and without destroying the molded shape of the unfired porcelain tooth. I also utilize the further characteristics I find this material has of forming a mold cavity with the inner mold surface thereof smooth and accurately reproducing all fine details of the natural teeth. The inner mold surface presented by this material is not porous or defective, nor does it have interstices which would render it unsuitable for the purpose described. The resistance to wear of this material is high, probably generally superior to that of a rigid mold. This refers to abrasive wear and, aside from the characteristics of the material, the compacting of the porcelain by prolonged vibration and without pressure further reduces wear on the mold.

The chemical stability of the mold material above described is also advantageous in using this material in making porcelain teeth and the like. There is no undesirable reaction between this mold material and the porcelain, and the plasticized polymerized vinyl halide material has the further advantageous property in a mold of the class described of contracting upon cooling accurately to reproduce the natural tooth.

After removal of the porcelain tooth from the resilient mold and after drying out and before fire-hardening, the tooth may be carved, machined, drilled, or otherwise finished. It may be dipped in wax or lacquer prior to carving, machining, drilling or otherwise operating upon the same as set forth in my herein identified copending application. As illustrative of any such operation as above pointed out, an opening 18 is drilled into the body of the tooth, as shown in dotted lines in Figure 3, for the purpose of mounting or anchoring the tooth. This opening forms retention means, and may receive a metal pin or be used in any other manner, and may be of any other desired form.

In the embodiment of the invention shown in Figures 5 and 6, a plurality of patterns or master models 20 of the teeth or other articles are placed upon a base 21 and within a trough 22 formed by the base 21 and a pair of upright side members 23. The base 21 and side members 23 may, by way of example only, be metal plates, chromium or otherwise suitably plated for chemical stability.

The mold material 24 is melted and poured into the trough 22 through the open top thereof, preferably in two or more parts. The first pouring encloses the sides and occlusal surfaces of the tooth patterns. The mold material chills against the surfaces of the models or patterns 20, and any air bubbles along these surfaces are reduced in size and finally eliminated and pass away from the surfaces of the patterns. They get larger as they leave the patterns and, because the mold material has chilled along the surfaces of the patterns so that they cannot return to such surfaces, these air bubbles rise and are freed at the upper surface of the mold material. The succeeding pouring or pourings of mold material brings the mold body to the desired thickness.

By way of example, the first pouring of mold material may be to about the dot and dash line a—a in Figure 6, and the next pouring may bring the mold body to the desired thickness, as shown. Upon completing the pouring of the mold material, a plate 25, preferably plated similar to the plates 23, may be placed upon the top of the mold material, as shown. This plate 25 exerts a downward pressure upon the mold material and prevents the resilient mold material from shrinking or pulling away from the patterns 20 as it cools and sets to the form of the resilient rubbery mold body with the mold cavities 26 therein. The plate 25 also makes the top surface of the mold straight or flat at 27 for proper support of the resilient mold upon a flat surface in forming the porcelain teeth in the cavities 26.

As in the preceding embodiment of the invention, the mold material is then allowed to cool, and sets to the form of a resilient rubbery solid mold body having the mold cavities 26 shaped to form the porcelain teeth or other articles. Upon setting of the mold body, the metal frame is removed and the patterns or models 20 are removed from the mold body by flexing same as previously described. The porcelain teeth or other articles are then formed in the mold cavities 26 as in the preceding embodiment of the invention, and removed from the mold body in green or unfired condition and subsequently fire-hardened to form the finished porcelain teeth.

In the embodiment shown in Figure 7, after first melting the mold material and pouring same while hot and fluid over the master models or patterns 20' within, for example, a trough 22' similar to the trough of the preceding embodiment of the invention except for the omission of the top plate 25, the entire metal trough or frame 22' with the patterns 20' completely covered by the hot and fluid mold material is placed in a pressure chamber 30.

Air pressure, preferably over about 100 pounds—although this may vary—is then applied through the inlet 31. This air pressure brings the resilient mold material uniformly into contact with the surface of the pattern. The mechanical compression thus produced greatly reduces the size of any air bubbles, and possibly bubbles due to vapors generated by the heating of the material, and eliminates same from the mold surface. Also, some of the bubbles which would ordinarily occur are entirely eliminated by the pressure because the pressure prevents the vapors from forming and thereby producing bubbles along the mold surface. After a short period of time the air is released by the release connection 32 and the mold is removed from the chamber 30. This procedure results in a resilient mold without any defects on the inner mold surfaces of the mold cavities 26' due to small air bubbles.

The mold body, designated at 40 in Figures 8 and 9, is of resilient character as previously described, and has one or more suitably shaped mold cavities, one mold cavity being shown at 41.

The particular cavity 41 shown in the drawing is shaped to form an anterior tooth, but it may be shaped to form any other form of tooth or dental article. Two oppositely disposed resilient protrusions 42, formed integral with the mold body 40 and of the same resilient material as the mold body, extend into the mold cavity 41 and form recesses in the opposite sides of the porcelain tooth in the formation of the tooth in the cavity 41. The recesses thus formed in the tooth may be used as retention means for anchoring the tooth in a denture base material, or they may be used for mounting the tooth on a color guide, as for example by engagement of suitable holding catches therein, or otherwise as desired.

Figures 10 and 11 show a mold body 43 of resilient character as previously described having a tooth cavity 44 shaped to form a posterior tooth generally in the form of a three-quarter crown. The overhanging portion 45 of the mold body is formed integral with the mold body and of the same resilient material as the mold body. A severe undercut portion is produced in the mold body as indicated at 46 to form the complete occlusal surface of the tooth as an integral part of the shell-like and, by way of example, generally U-shaped labial and side portions formed in the portion 47 of the cavity 44. The use of this mold has demonstrated very clearly the ability to make and remove a tooth with extraordinarily severe undercuts from the mold of my present invention.

Figure 12 shows a resilient mold embodying the present invention and adapted for making a tube tooth. The resilient mold body is indicated at 50 and the mold cavity is indicated at 51. A metal rod or pin 52, preferably of "Monel" or other suitable metal which is relatively stable chemically and which rod or pin is slightly tapered, extends vertically through the median portion of the cavity 51 and has its thinner end anchored in the resilient mold body at 53. The upper thicker end of the rod or pin 52 is preferably flattened out at 54 to enable the operator to insert the pin or rod the correct way. The green porcelain tooth is formed in the cavity 51 and about the pin or rod 52 as previously described.

After the porcelain has been packed into the mold cavity 51 and around the pin or rod 52 and after the porcelain is thoroughly compacted through prolonged vibration, the green porcelain tooth is removed from the resilient mold body together with the metal pin by flexing the mold. The metal pin 52 is then pulled out of the tooth, the taper of the pin facilitating this. The resulting tooth, which has an opening extending all of the way through the same, is then dried out and fired in the usual manner.

The method of forming a hole through the tooth as above described is capable of variation—namely, by providing a consumable pin made of wax or a synthetic resin or of paper which could be inserted in the mold, and after the tooth has been formed the consumable piece could be left in the tooth so that it will burn out or be otherwise eliminated during the fire-hardening operation. The consumable insert may also be used as a means for producing undercut recesses and the like in the porcelain teeth. It is possible, by means of a consumable pin, to produce a hole extending entirely or partially through the tooth which would be free of any taper required to permit ready withdrawal of a metal or non-consumable pin.

I also contemplate the use of a preformed ceramic insert which may, for example, be in the biscuit state and could be fixed in the resilient mold, either directly, or carried by a pin, which ceramic insert would be left in the tooth and would become integral with it upon firing. Such inserts may be made of extruded ceramic material, either solid or tubular, and, if desired, may be turned or machined to a particular shape. A ceramic insert could be used about the threaded inner end of the pin 78 shown in Figure 16 as a means of forming a threaded hole in a porcelain tooth or other porcelain article, or for any other desired purpose.

The mold and pin combination shown in Figure 13 is similar to the mold and pin combination shown in Figure 12, and like parts are designated by primed reference characters corresponding with the reference characters in Figure 12. In this case, the lower end of the tapered metal pin 52' is reduced at 56, and this reduced end 56 is anchored in the resilient mold body at 53' and extends up into the mold cavity 51'. This provides an opening or hole in the resulting tooth of the desired size along the tapered portion of the pin 52', and at the same time a reduced opening from the surface of the tooth along the reduced part 56 which extends into the mold cavity. This reduction in the size of the opening at the surface of the tooth is desirable in some cases.

A supporting pin is adapted to be cemented in the larger opening formed in the tooth by the tapered portion of the pin 52', and the small hole formed in the occlusal end of the tooth by the reduced end 56 of the pin permits the cement to escape out of the small opening in cementing the tooth on such a pin. This avoids any plunger action and prevents splitting of the tooth by such action in cementing it on the supporting pin. The small hole thus formed in the occlusal end of the tooth also permits the application of acid in removing the tooth from its supporting pin.

The mold designated at 60 in Figure 14 is of resilient character as previously described and has one or more mold cavities, one mold cavity being shown at 61. A metal pin insert 62 is anchored at its lower end in the resilient mold body at 63 and extends up through the median portion of the mold cavity 61. After the porcelain has been packed into the mold cavity 61 and to the metal insert 62 as previously described, the mold is flexed and the green porcelain tooth pulled from the pin 62. The green porcelain tooth is then dried out and fired as before.

In the embodiment of the invention shown in Figure 14, the base portion of the mold as indicated at 64 is formed of firmer resilient material than the upper part provided with the tooth cavity. The lower end of the pin 62 is anchored in the harder or firmer resilient base 64, and therefore has firmer support for maintaining the desired position of the pin in the mold cavity. This is advantageous because in making teeth of this sort it is important that the holes are always in the same position as it is quite often necessary to make a repair, and if the position of the hole in the tooth varies it is impossible to fit such a tooth to a metal boxing and pin.

The resilient mold and pin combination shown in Figure 15 is the same as shown in Figure 12, except that the tapered pin 68 is put in sidewise through the mold body 69 and extends sidewise through the mold cavity 70. The hole formed in the porcelain tooth with the sidewise disposed pin 68 is adapted for use as retention means for anchoring the tooth in denture base material, for example by putting a wire through it and twisting the wire to form a loop, which loop would be embedded in the denture base material, or the hole formed in the porcelain tooth with the sidewise disposed pin 68 may be used for stringing the tooth on a wire, chain, or other tooth carrier of a color guide. The pin 68 has a slight taper as shown to facilitate removal, and its outer end may be flattened at 71.

The resilient mold body shown at 75 in Figure 16 is likewise of resilient character as previously described. The tooth cavity is indicated at 76, and a metal pin 78 is supported in the mold body. The inner end of this pin 78 is threaded at 79 and protrudes into the mold cavity 76. After the tooth has been packed and formed in the mold cavity, the pin 78 is screwed out of the green porcelain tooth and out of the resilient mold, leaving a threaded recess in the green porcelain tooth, which is then removed from the mold, dried out, and fired as before.

In Figures 17, 18 and 19, the resilient mold body 82 of the character previously described has a mold cavity 83, and a metal pin 84 is supported with its inner end spaced from the inner mold surface 85 which forms the occlusal surface of the tooth. As a result, the hole formed in the tooth by the pin 84 does not go all of the way through the tooth. A so-called porcelain crown is produced in this type of mold.

The pin 84 is supported by a metal insert 86 anchored in the resilient mold body 82 at 87, 87.

The metal insert 86 extends across the gingival end of the tooth cavity, and has an opening 88 at the median portion of the cavity. The pin 84 extends through the opening 88, and at its outer end has a collar 89 or other abutment means fixed thereon. This collar or abutment means 89 engages the metal insert 86 and supports the pin in properly located position in the mold cavity and with the inner end of the pin spaced from the mold surface 85. The pin 84 below the insert 86 preferably has a slight taper to facilitate removal from the green porcelain tooth after the tooth is formed by packing the moistened porcelain in the cavity 83 and to the pin 84, the pin 84 being removed by pulling same from the green porcelain tooth, after removing the insert 86 with the pin 84 and the green porcelain tooth from the mold body 82. The green porcelain tooth with the opening which does not extend completely through the same is then dried out and fired. The porcelain is introduced into the mold cavity through the spaces around the insert 86 as shown in Figures 17 and 19.

The form of metal pin shown in Figure 20 is adapted for use in the manner of the pins shown in Figures 13 and 14 This pin consists of two parts—a thin metal pin 92 which is embedded at its inner end in the resilient mold material and supports telescopically the larger metal pin or rod part 93 which forms the retaining hole in the tube tooth. The resilient mold body is not shown in this figure, but it is to be understood that the upper end of the thin metal pin part 92 will preferably extend up into the mold cavity in the manner in which the reduced pin part 56 extends into the mold cavity 51' in Figure 13.

The mold designated at 95 in Figures 21 and 22 is of resilient character as previously described, and has the mold cavity 96 shaped to produce a so-called bridge tooth. This type of tooth is mostly used in fixed bridge work, and that portion of the tooth which is in contact with the backing must be accurate. If such a tooth should break in the mouth the dentist should be able to cement in a new tooth, and, in this way, make a simple repair. It is, therefore, of great importance that the size and position of the holes and also the straight parts which are in contact with the metal backing or support are always exactly the same.

In order to obtain this accuracy, I provide a metal insert in the resilient mold body, which insert consists of a metal plate 98 of angular form as shown, and three metal pins 99, 100, and 101. After the porcelain has been packed into the mold and to the plate part 98 and around the inwardly protruding ends of the pins 99, 100, and 101, and after the porcelain is thoroughly compacted through prolonged vibration, the green porcelain tooth, together with the metal parts, is removed from the flexible mold. The metal pins are pulled out and the metal plate is removed from the green porcelain tooth, leaving the recesses formed by the pins of accurate size and accurately positioned, and accurately positioning the straight portions 102. The tooth is then dried out and fired as previously described.

The backing member to which the tooth formed with the mold and insert means of Figures 21 and 22 is secured has metal pins for engagement in the recesses formed by the pins 99, 100, and 101. The pin on the backing member which engages in the recess formed by the pin 99 may be under size to facilitate application of the tooth to the backing member over such pin, or the tooth may be formed with the resilient mold and insert means as shown in Figures 23 to 26 to permit application of the tooth to the backing member and over the retention pins or other retention means thereon.

The resilient mold and insert means shown in Figures 23 to 26, inclusive, are similar to the mold and insert means shown in Figures 21 and 22 except that the metal plate 98 has a turned in or flanged portion 104 anchored in the mold body 95', and the pins 105 and recess forming portion 106 are formed of rubber or the like to be self-retaining in the openings 107 and 108 in the metal plate 98'. The end of the plate 98 opposite the flange 104 is also anchored in the resilient mold body as shown. The tooth cavity is indicated at 96'. The porcelain tooth is formed in the cavity 96' and against the metal plate and rubber inserts and is removed and dried out and fired in the manner described in connection with Figures 21 and 22.

The mold and insert means shown in Figures 27 and 28 are adapted for producing porcelain tooth facings which are known in the art as "Steel's" facings. The mold body 110 is of resilient character as previously described, having, for example, a plurality of mold cavities 112. The metal insert consists of a plate part 114 embedded in the resilient mold body and which may, by way of example, be made up in sections as shown. The sections may be embedded singly and retained by the flexible mold body in conjunction with each mold cavity, or these sections may be soldered or otherwise secured together at 115. Keys 116 have dovetailed or interlocking sliding engagement at 117 with the metal plate part, one such key 116 being shown for each porcelain facing forming cavity 112.

After the porcelain has been packed into the mold cavities 112 and to the metal insert, the whole is removed and the metal keys are first pulled out of the green porcelain facings and the metal plate. Then the metal plate is removed from the green porcelain facings, leaving the surfaces 118 of the porcelain facings accurately finished and the green facings are then dried out and fired.

Figures 29 to 33, inclusive, show another advantage of the resilient mold, which resides in its adaptability to be stretched, compressed, or even bent or otherwise distorted, to change the shape of the mold cavity.

The mold body 125 is formed of resilient material as heretofore described, and in this case is provided with a plurality of mold cavities 126—specifically six of such cavities. The inner surface of each mold cavity is continuous throughout. The resilient mold body 125 is provided with a metal channel 127, the sides of which are corrugated at 128 or otherwise formed to hold the mold body with the mold cavities 126 shaped as shown in Figure 31. The opposite ends of the channel 127 may be open as shown, although this may vary.

A second metal channel 130 (Figure 32), somewhat narrower than the channel 127 with its side walls corrugated or otherwise suitably shaped at 131, is adapted to hold the resilient mold body 125 compressed transversely and stretched or elongated longitudinally. When the resilient mold body is positioned in the channel 130 the mold cavities 126 are elongated longitudinally of the mold and reduced in dimension transversely of the mold body. The opposite ends of the channel 130 may likewise be open as shown, although this, too, may vary.

A third metal channel 134 (Figure 33), somewhat wider than the channel 127 with its side walls corrugated or otherwise suitably shaped at 135 and provided with closed ends 136, is adapted to hold the resilient mold body 125 compressed longitudinally and extended transversely. By positioning the resilient mold body in the channel 134, the dimensions of the mold cavity 126 longitudinally of the mold are reduced and the transverse dimensions of these cavities 126 are increased.

By variations of such holding devices for the flexible mold body, the mold cavities may be distorted to any desired shape, which reduces the number of resilient molds which must be stocked to produce a given number of different shapes of teeth.

Other methods of deforming or changing the shape of the resilient mold body to change the shape of the one or more mold cavities are contemplated within the scope of the present invention. For example, means may be secured to one or both ends of the mold and provided with screw means operable in fixed members, the screw means being adjustable to stretch or compress the resilient mold to change the shapes of the one or more mold cavities as desired. Another method would be to have holes molded in the flexible mold body—for example at each end—so that pins could be inserted and the mold could then be stretched by moving the pins apart and fixing them.

While the mold of my invention is particularly suited for the production of denture parts, such as artificial teeth, as above explained, it may be used, within the broader aspects of my invention, for the production of various other articles or parts thereof.

By way of example only, I propose in carrying out the present invention to obtain a variety of sets of natural teeth of different types and sizes and to arrange them in complete sets, both for upper and lower jaws. These natural teeth may be modified by carving, as required. After the natural teeth have been modified, which may be done by carving or grinding, or by adding to them dental cement or hard wax, an enlarged pattern is made and the flexible mold is made from the enlarged pattern, the enlargement of the pattern being of any desired degree to take care of the shrinkage of the porcelain teeth in firing the same.

I do not intend to be limited to the precise details shown or described.

I claim:

1. In combination, a flexible mold body having a mold cavity adapted to form a molded article of a form conforming with the normal shape of said mold cavity, and metal channel means for deforming the flexible mold body to change the normal shape of the mold cavity so as to form a molded article of a different shape in said mold cavity.

2. A mold comprising a unitary body having formed therein a mold cavity of the size and shape of the desired article to be produced from said mold and a pouring opening leading to said cavity, said body being formed of a plasticized polymerized vinyl halide in the form of a soft and highly elastic gelled material.

3. A mold comprising a unitary body having formed therein a mold cavity of the size and shape of the desired article to be produced from said mold and a pouring opening leading to said cavity, said body being formed of a plasticized polymerized vinyl chloride in the form of a soft and highly elastic gelled material.

4. A dental mold for the production of porcelain denture parts, said mold comprising a unitary body having formed therein a mold cavity of the size and shape of the desired article to be produced from said mold and a pouring opening leading to said cavity, said body being formed of a plasticized polymerized vinyl chloride in the form of a soft and highly elastic gelled material.

REINER W. ERDLE.